(12) United States Patent
Roddy (10) Patent No.: US 6,678,880 B1
(45) Date of Patent: *Jan. 13, 2004

(54) SYSTEM FOR ITERATIVELY DESIGNING AN OBJECT HETERARCHY IN AN OBJECT-ORIENTED COMPUTING ENVIRONMENT

(75) Inventor: Brian J. Roddy, Menlo Park, CA (US)

(73) Assignee: Apple Computer, Inc., Cupertino, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/436,830

(22) Filed: May 8, 1995

(51) Int. Cl.[7] ................................................. G06F 9/45
(52) U.S. Cl. ......................... 717/108; 717/109; 717/113
(58) Field of Search .................... 395/683, 682, 395/354, 334, 701; 717/108, 109, 113

(56) References Cited

U.S. PATENT DOCUMENTS

| | | | | | |
|---|---|---|---|---|---|
| 5,119,475 A | * | 6/1992 | Smith et al. | ................ | 345/810 |
| 5,339,433 A | * | 8/1994 | Frid-Nielsen | ............... | 709/218 |
| 5,410,648 A | * | 4/1995 | Pazel | ......................... | 395/158 |
| 5,418,964 A | * | 5/1995 | Conner et al. | .............. | 709/316 |
| 5,432,903 A | * | 7/1995 | Frid-Nielsen | ............... | 395/161 |
| 5,455,599 A | * | 10/1995 | Cabral et al. | ............... | 345/418 |
| 5,493,680 A | * | 2/1996 | Danforth | .................... | 717/108 |
| 5,499,371 A | * | 3/1996 | Henninger et al. | ......... | 707/102 |
| 5,537,630 A | | 7/1996 | Berry et al. | ................. | 717/109 |
| 5,546,519 A | * | 8/1996 | Berry | .......................... | 395/155 |
| 5,560,014 A | * | 9/1996 | Imamura | .................... | 395/700 |
| 5,572,733 A | * | 11/1996 | Ryu et al. | .................... | 395/701 |
| 5,642,511 A | * | 6/1997 | Chow et al. | ................ | 345/967 |
| 5,644,771 A | * | 7/1997 | Endicott et al. | ............ | 717/170 |
| 5,692,195 A | * | 11/1997 | Conner et al. | .............. | 709/316 |
| 5,699,310 A | * | 12/1997 | Garloff et al. | .............. | 717/108 |
| 5,761,511 A | * | 6/1998 | Gibbons et al. | ............. | 717/122 |
| 5,832,487 A | * | 11/1998 | Olds et al. | .................... | 707/10 |
| 6,070,006 A | * | 5/2000 | Iriuchijima et al. | ......... | 717/108 |

OTHER PUBLICATIONS

Myers et al, "Environment for Rapidly Creating Interactive Design Tools", The Visual Computer, vol. 8, #2, 1992, pp. 94–116.*

Petyold, C., "The Visual Development Environment, More Than Just a Pretty Face", Jun. 16, 1992, PC Magazine, pp 195–200, 204, 206, 209, 210, 215, 216, 221, 222, 224, 225, 226, 227, 232, 234, 236, and 237.*

Vlissides et al., A Unidraw Based User Interface Builder, Nov. 1991, ACM, p. 201–210.*

Bingham et al., Experiences Developing and Using an Object Oriented Library . . . , 1993, ACM, p. 83–89.*

* cited by examiner

Primary Examiner—John Chavis
(74) Attorney, Agent, or Firm—Burns, Doane, Swecker & Mathis, L.L.P.

(57) ABSTRACT

An object-oriented computing environment stores information relating to objects in a data file, and manipulates the information in the data file through a suitable user interface. The interface permits a user to completely redesign a program structure by adding or removing parents of an object through simple actions such as menu commands or drag and drop operations. The precedence of parents in a heterarchy can be reordered, again through drag and drop operation. A new parent can be spliced between an existing parent and its children. Properties and handlers can be moved to appropriate levels of the program structure through simple operations, and the user can be provided with choices to make appropriate functionality changes to individual objects, as desired.

20 Claims, 6 Drawing Sheets

| OBJECT | PROPERTIES | HANDLERS | PARENTS | CHILDREN |
|---|---|---|---|---|
| ROUND RECT | SHAPE 1 | FUNCTION 1 | | BUTTON 1 |
| | | | | BUTTON 2 |
| | | | | BUTTON 3 |
| | | | | BUTTON 4 |
| BUTTON 1 | COLOR 1 | FUNCTION 2 | ROUND RECT | |
| BUTTON 2 | COLOR 2 | FUNCTION 2 | ROUND RECT | |
| BUTTON 3 | COLOR 3 | FUNCTION 2 | ROUND RECT | |
| BUTTON 4 | COLOR 4 | FUNCTION 3 | ROUND RECT | |

| OBJECT | PROPERTIES | HANDLERS | PARENTS | CHILDREN |
|---|---|---|---|---|
| ROUND RECT | SHAPE 1 | FUNCTION 1 | | BUTTON 1 |
| | | | | BUTTON 2 |
| | | | | BUTTON 3 |
| | | | | BUTTON 4 |
| BUTTON 1 | COLOR 1 | FUNCTION 2 | ROUND RECT | |
| | | | TRANSPAR... | |
| BUTTON 2 | COLOR 2 | FUNCTION 2 | ROUND RECT | |
| BUTTON 3 | COLOR 3 | FUNCTION 2 | ROUND RECT | |
| BUTTON 4 | COLOR 4 | FUNCTION 3 | ROUND RECT | |
| | | | FLOATING | |
| TRANSPAR... | APPEAR1 | FUNCTION 4 | | BUTTON 1 |
| FLOATING | APPEAR2 | FUNCTION 5 | | BUTTON 4 |

| OBJECT | PROPERTIES | HANDLERS | PARENTS | CHILDREN |
|---|---|---|---|---|
| ROUND RECT | SHAPE 1 | FUNCTION 1 | | BUTTON 4 |
| SUPER-BUTTON | | FUNCTION 2 | ROUND RECT | BUTTON 1 |
| | | | | BUTTON 2 |
| | | | | BUTTON 3 |
| BUTTON 1 | COLOR 1 | | SUPERBUT... | |
| BUTTON 2 | COLOR 2 | | SUPERBUT... | |
| BUTTON 3 | COLOR 3 | | SUPERBUT... | |
| BUTTON 4 | COLOR 4 | FUNCTION 3 | ROUND RECT | |

SYSTEM FOR ITERATIVELY DESIGNING AN OBJECT HETERARCHY IN AN OBJECT-ORIENTED COMPUTING ENVIRONMENT

FIELD OF THE INVENTION

The present invention is directed to computers which operate with object-oriented programs, and more particularly to a system which permits the hierarchy of objects in an object-oriented computing environment, as well as the characteristics of those objects, to be dynamically designed and modified.

BACKGROUND OF THE INVENTION

Object-oriented programming of computers is gaining increasing popularity, in large part due to the great deal of flexibility which it offers with a relatively simple structure. Generally speaking, an object-oriented program comprises a collection of software entities known as objects, each of which is responsible for performing a particular task. Every object is characterized by associated properties, or data values, and one or more handlers that provide certain behavior or functionality. In operation, one object invokes the handlers of another object, to cause the second object to exhibit its associated behavior.

The behavior and properties of a given object can be extended to other objects through an inheritance structure. In such a structure, groups of associated objects can be organized in a hierarchical inheritance tree. In this type of arrangement, an object at a particular level of the hierarchy will inherit the properties and behavior of objects at higher levels from which it descends. Similarly, its property and behavior, including that inherited from higher-level objects, is passed on to lower-level objects that descend from it in the hierarchy.

The inheritance of object properties and handlers in an object-oriented program provides a number of desirable characteristics. Foremost among these is the reusability of software. Since an object at a lower level of the hierarchy inherits all of the behavior of objects at higher levels, the program code that provides particular behavior does not have to be rewritten for each object that is to exhibit that behavior. Consequently, fewer instances of that code exist in the program, and the debugging and testing of that portion of the code is therefore simplified. Another desirable aspect of inheritance is the consistency of interfaces that are provided. All objects which inherit from the same object or set of objects at a higher level of the hierarchy will exhibit the same properties and behavior, and thus present a consistent interface to the user.

Programming in an object-oriented system requires the programmer to build a structure for the set of objects, which defines how properties and handlers are to be inherited. Designing such a structure can be a complex and difficult task. Typically, the programmer doesn't begin the design of the code with the optimum structure in mind at the outset. Rather, as the program is developed, the designer typically discovers desirable variations to the original structure. For example, the designer may discover that a number of objects share a common attribute, and therefore should descend from a common parent to encapsulate that attribute. During development, the overall structure of the object-oriented program, i.e., its inheritance hierarchy, is typically modified over several iterations in such a fashion.

In the past, most program code for object-oriented systems has been text-based. More particularly, the relationships between objects in the hierarchy was described by means of a text file. From this text file, a database was built in working memory, e.g. RAM, to define the relationships during the run-time of the computer. Redesigning of the hierarchy in such systems involved changing the text scripts that defined the hierarchical relationships of the objects. These types of changes required the programmer to manually search through all of the files to find relevant portions of code and objects, and make the required changes. Typically, this was carried out by means of rather crude search and replace operations.

The redesigning of the code structure was even more complicated for object-oriented systems which support multiple inheritances. In these types of systems, an object can descend from, i.e. inherit properties and handlers from, more than one parent object at higher levels of the structure. The term "heterarchy" is used to describe the structure which exists in this type of system. A heterarchy differs from a conventional hierarchy by virtue of the fact that, in a hierarchy each object descends from one, and only one, parent object, whereas in a heterarchy each object can directly descend from more than one parent object. When an object descends from two or more parents, the parents are given a relative priority, or precedence, with respect to that object, in the event that some of their properties and/or handlers are mutually exclusive to one another. Because the interrelationships of objects in a heterarchical structure is much more complex, redesigning such a structure becomes significantly more difficult.

A particularly complex task in the redesign of the program structure is the addition and deletion of levels of the hierarchy or heterarchy. Typically, these kinds of changes involved writing new code to describe new objects in an added level or to remove references to objects in a deleted level, and then recompiling the program to incorporate the newly added code. Similarly, in the design of the program, if it became desirable to reorganize properties or handlers, for example to transfer a property from a descendant object to a newly added parent object, the associated code had to be rewritten and then recompiled.

It is desirable, therefore, to provide a system which permits a user to dynamically design and rearrange object structure, as well as design and rearrange the properties and handlers for an object after the structure has been redesigned, without the need to rewrite and recompile code.

SUMMARY OF THE INVENTION

In accordance with the present invention, this objective is achieved in an object-oriented computing environment by storing information relating to objects in a data file, and manipulating the information in the data file through a suitable user interface. The interface permits a user to completely redesign the program structure by adding or removing parents of an object through simple actions such as menu commands or drag and drop operations. In addition, the precedence of parents in a heterarchy can be reordered, again through a drag and drop operation. Furthermore, layers can be added to, or delete from, the program structure. For example, a new parent can be spliced between an existing parent and its children. Properties and handlers can be moved to appropriate levels of the program structure through simple operations, and the user can be provided with choices to make appropriate functionality changes to individual objects, as desired.

Further features of the invention, and the advantages offered thereby, are explained in detail hereinafter with reference to specific embodiments illustrated in the accompanying drawings.

DETAILED DESCRIPTION

To facilitate an understanding of the principles which underlie the present invention, it is described hereinafter with reference to specific embodiments. For example a specific window design is: illustrated in the accompanying drawings for the interface by which a user can redesign the structure of an object-oriented program. Furthermore, specific examples of objects and structures are described in the context of the prototype approach to object-oriented systems. It will be appreciated, however, that the invention is not limited to the specific described embodiments. Rather, it will find applicability in any type of object-oriented programming environment, and with a wide variety of user interfaces.

Generally speaking, the present invention is directed to a system for dynamically designing the hierarchical or heterarchical structure of an object-oriented computer system. While the particular hardware components of a computer system do not form a part of the invention itself, they are briefly described herein to provide a thorough understanding of the manner in which the features of the invention cooperate with various components of a computer system, to produce the desired results.

Figure 1:
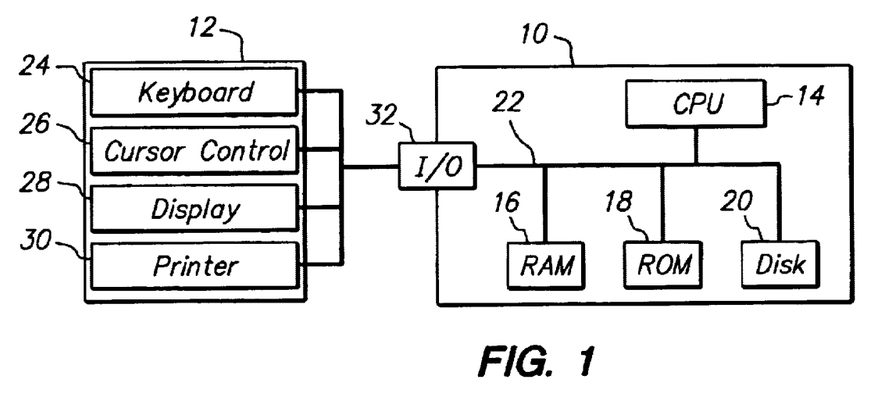
FIG. 1 is a block diagram of the general hardware components of an exemplary computer system.

Referring to FIG. 1, a typical computer system includes a computer 10 having a variety of external peripheral devices 12 connected thereto. The computer 10 includes a central processing unit 14 and associated memory. This memory generally includes a main memory which is typically implemented in the form of a random access memory 16, a non-volatile memory that can comprise a read only memory 18, and a permanent storage device, such as a magnetic or optical disk 20. The CPU 14 communicates with each of these forms of memory through an internal bus 22. The peripheral devices 12 include a data entry device such as a keyboard 24, and a pointing or cursor control device 26 such as a mouse, track ball, pen or the like. A display device 28, such as a CRT monitor or an LCD screen, provides a visual display of the information that is being processed with the computer, for example the contents of a document or a computer generated image. A hard copy of this information can be provided through a printer 30, or similar such device. Each of these external peripheral devices communicates with the CPU 14 by means of one or more input/output ports 32 on the computer.

In the context of the present invention, at least some of the software which resides in the RAM 16 of the computer, and which is executed by the computer to perform desired tasks, is structured as an object-oriented program. For example, this software could comprise the operating system for the computer, by means of which it performs such basic tasks as responding to input commands entered by the keyboard 24 and the cursor control device 26, reading information from each of the forms of memory 16, 18 and 20, providing a graphical user interface on the display device 28, and communicating with the printer 30. Alternatively, or in addition, the object-oriented software can comprise one or more application programs which enable the user to perform specific tasks with the computer, such as word processing, graphic design and communications. As described previously, in an object-oriented system, each object is an autonomous agent that has associated properties and handlers. The various objects communicate with one another to carry out one or more specific tasks. Thus, for example, in an operating system, one object may be responsible for sending data to and controlling the operation of the printer 30, another object may control the writing of graphical information on the display 28, and another object can carry out the tasks of reading and writing information from the disk 20. Similarly, in a word processing program, one object may control a scrollbar to present different portions of the text in a display window, and various other objects may perform the operations of respective tools in a toolbar.

Figure 2:
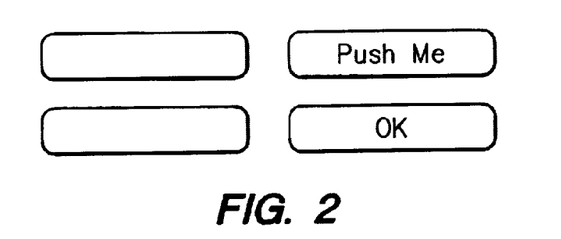
FIG. 2 is an illustration of four exemplary buttons that constitute objects in a graphical user interface.

In the following description, the present invention will be explained with reference to objects that pertain to elements of a graphical user interface, namely user-actuated buttons. An example of four such buttons is shown in FIG. 2. These buttons might form part of a dialog box or other user interface element which is displayed on the display device 28 to permit the user to select from among various available choices for a particular operation or feature. It will be appreciated that this particular set of objects is merely exemplary for purposes of explaining the present invention. The applicability of the features of the present invention to all types of objects will become apparent from this example.

Figure 3:
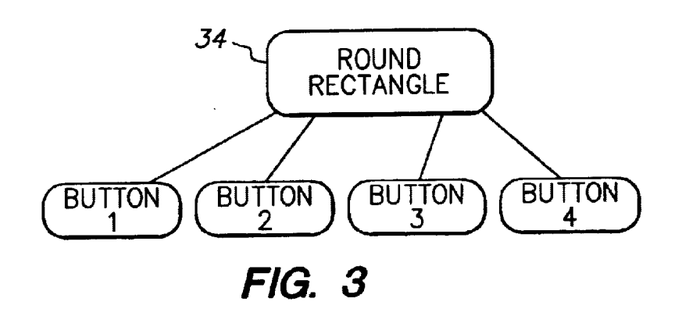
FIG. 3 is an example of a hierarchical program structure.

Initially, when an object-oriented program is designed, the four buttons might have a hierarchical relationship as depicted in FIG. 3. All of the buttons inherit from a common parent, a round rectangle object 34. As such, they inherit the properties of the round rectangle object. For example, they all have the same shape, i.e., a rectangle with rounded corners. In addition, they inherit the functional properties of the round rectangle. For example, each one may become highlighted if the user actuates a cursor control device when the cursor is located over the button, to select that particular button. The various buttons can also have individual properties which are not inherited from the parent object 34, and therefore not necessarily shared among them. For example, each button might be a different color.

Figure 4:
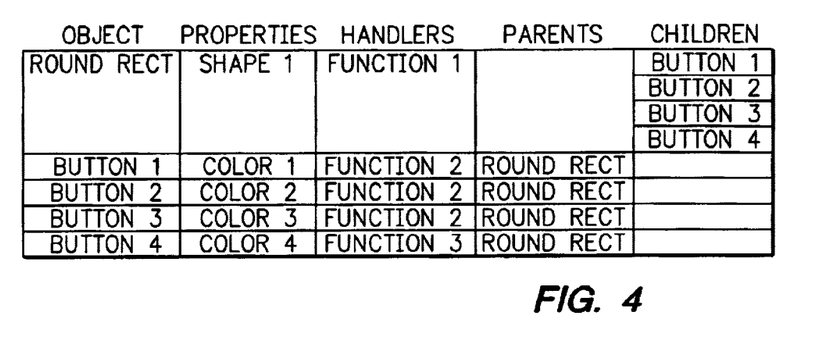
FIG. 4 is an illustration of the data file for the example of FIG. 3.

The properties and handlers of the buttons, as well as their hierarchical ancestors and descendants, are recorded in a persistent data file that is stored within the permanent memory 20 of the computer. In addition, this data file, or one created from the information contained in the data file, resides in the working memory 16 of the computer while the program is running. An example of the data file for the particular hierarchical arrangement of FIG. 3 is shown in FIG. 4. Referring thereto, the file is structured as a database. Each object effectively forms a record in the database, and the fields for each record indicate that object's associated properties, handlers, parents and children. In the example of FIG. 4, each object is shown having only one property and one handler. In practice, each object can have any number of associated properties and handlers.

Figure 5A:
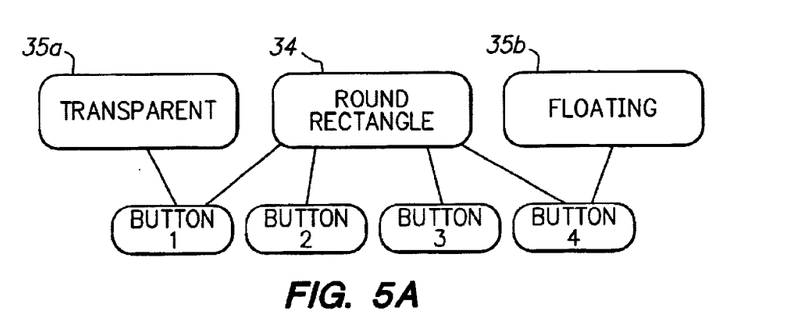
FIGS. 5A and 5B respectively illustrate a heterarchical program structure and its associated data file.

The example of FIG. 3 pertains to a hierarchical object-oriented system, in which each object has only one parent object. In a heterarchical system, any object can have more than one parent. An example of such a system is shown in FIG. 5A, in which each of the first and fourth buttons inherit properties from two additional parent objects 35a and 35b, respectively. The data file which pertains to this structure is shown in FIG. 5B.

Figure 5B:
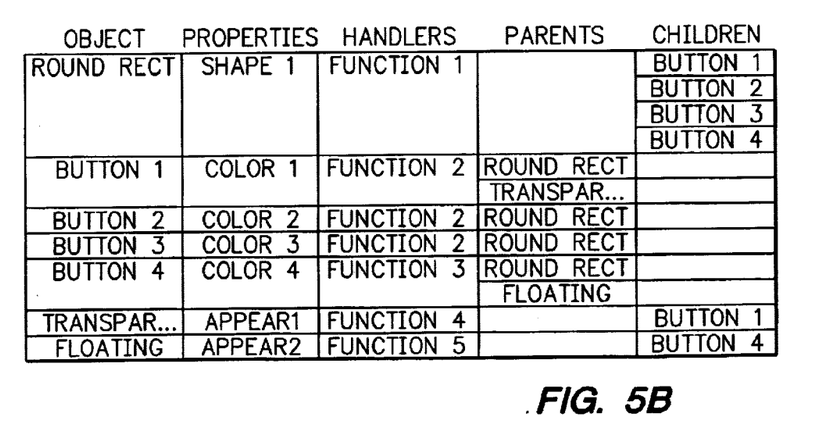

In the data files of FIGS. 4 and 5B, the entries for the parents and children of each object are shown as the names of the respective objects. In practice, the actual entries in the file may comprise pointers to the location of the records for those objects. Thus, if the record for the round rectangle object is stored at memory address 1234, the entry under "Parents" for each of the four button objects would be a pointer to address 1234. This pointer functions as an indicator that each button inherits the properties and handlers of the object whose record is stored at that location.

Figure 6:
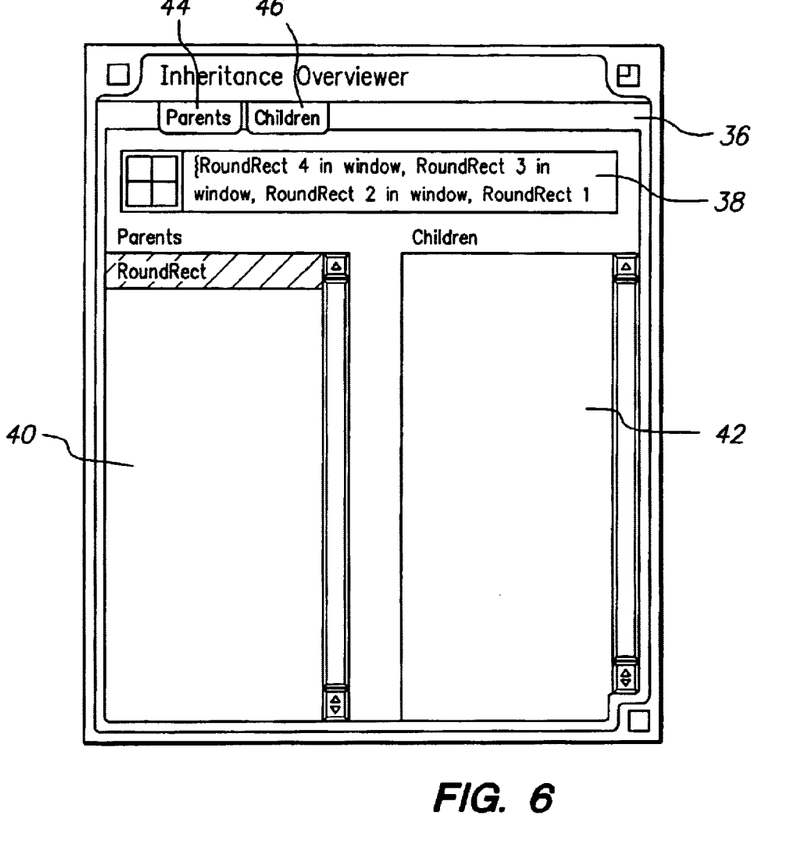
FIG. 6 is an illustration of a user interface window for redesigning the structure of an object-oriented program.

By storing the persistent data relating to the characteristics and relationships of objects in this manner, the ability to dynamically edit the features of objects, either programmatically or via direct manipulation, is greatly facilitated. Changes that are made to the data file are immediately implemented, and can be saved and loaded at a later time with no additional effort being required. This editing capability is further facilitated by means of a graphical interface which permits the user to readily view and manipulate the structural relationships of the objects. One example of such a user interface is depicted in FIG. 6. Referring thereto, the particular interface is a window 36 that is labelled an "Inheritance Overviewer". The inheritance overviewer window 36 is divided into three panels. The top panel 38 is an input panel which enables the user to specify an object, or group of objects, to be viewed or edited. The lower left panel 40, labelled the parent panel, lists the parents of the selected object identified in the input panel. If multiple objects have been selected by the user, for example all four of the buttons illustrated in FIG. 3, only parents which are shared by all of those objects are displayed in the parent panel 40. The lower right panel 42, labelled the children panel, displays the descendants of the selected object. If multiple objects are selected, shared descendants are displayed. In the example of FIG. 3, none of the selected buttons has any descendants, and so no children are shown in the panel 42.

In addition to providing information to the user about the inheritance hierarchy of selected objects, the inheritance overviewer permits a user to redesign the program structure, for example to add new parents. For this purpose, the window can be provided with a menu item 44 pertaining to parents. By selecting this menu item, a submenu (not shown) is displayed which contains commands to add or delete a parent. If the user chooses the command to add a parent, a dialog box prompts the user to enter the name of a new parent, which will then appear in the list of parents in the panel 40. Similarly, a children menu item 46 can be provided, to permit the user to add or delete children for the selected object.

When one of these operations is performed via the inheritance overviewer window, the contents of the data file is modified to reflect the new relationship. For example, if the user decides to change the structure of FIG. 3 to that of FIG. 5A, by adding two new parent objects 35a and 35b, records for these two new parent objects are added to the database, as shown in FIG. 5B. In addition, parent pointers to these new parent objects are added to the records for their children. If the parent objects are already present in the database, the pointers for the existing objects are modified accordingly. The modification of the contents of the database is carried out by means of a software module associated with the inheritance overviewer window, which itself can form another object. Whenever the user opens the inheritance overviewer window, this module is launched and responds to user commands within the window to modify the contents of the database file accordingly.

Figure 7:
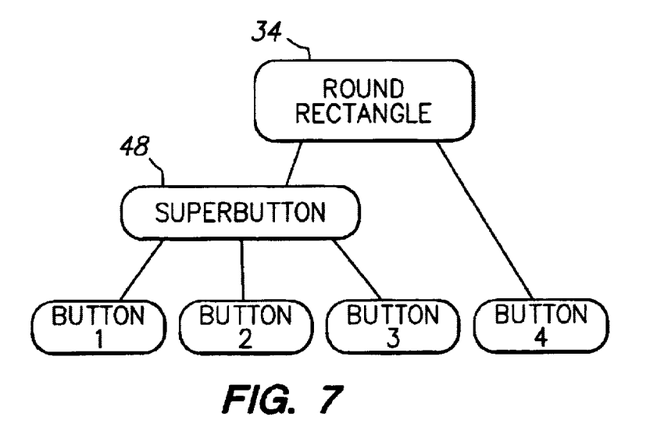
FIG. 7 is another example of a hierarchy into which a new object has been spliced.

A further feature of the present invention which is facilitated by the inheritance overviewer window and the data file structure for object information is the ability to add or delete levels of the hierarchy. For example, it is possible to splice a new parent between currently established parents and children. Referring to FIG. 4, it can be seen that button numbers 1, 2 and 3 all have a common handler, labelled "function 2". Rather than duplicate the code which executes function 2 for each of these three objects, it is preferable to create a single object which exhibits this functionality, and to have each of the three buttons descend from it. For example, the function may be for the button to generate an audible "click" whenever the user actuates it. A single object which exhibits this functionality is labelled a "superbutton" in this particular example. A new hierarchy which contains a superbutton object 48 spliced between the round rectangle object 34 and each of buttons 1, 2 and 3 is illustrated in FIG. 7.

Figure 8:
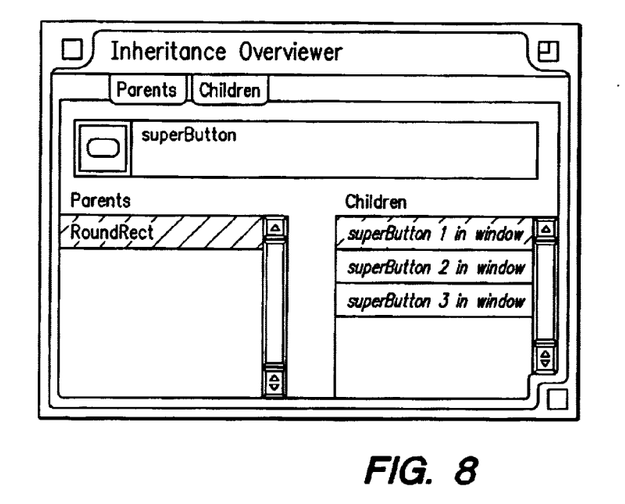
FIG. 8 is an illustration of the inheritance viewer window after a spliced object has been added.

To perform this operation of splicing the superbutton object 48 into the hierarchy, the user selects the objects for buttons 1, 2 and 3 in the input panel 38 of the inheritance overviewer window 36, and then issues a command to splice a new parent. This command can be available, for example, as part of a submenu which appears under the parents menu command 44. In response to selecting the splice command, the selected objects are moved from the input panel 38 to the children panel 42, and the user enters the name of the new parent in the input panel. The result is as shown in FIG. 8, which corresponds to the hierarchical structure shown in FIG. 7.

Figure 9:
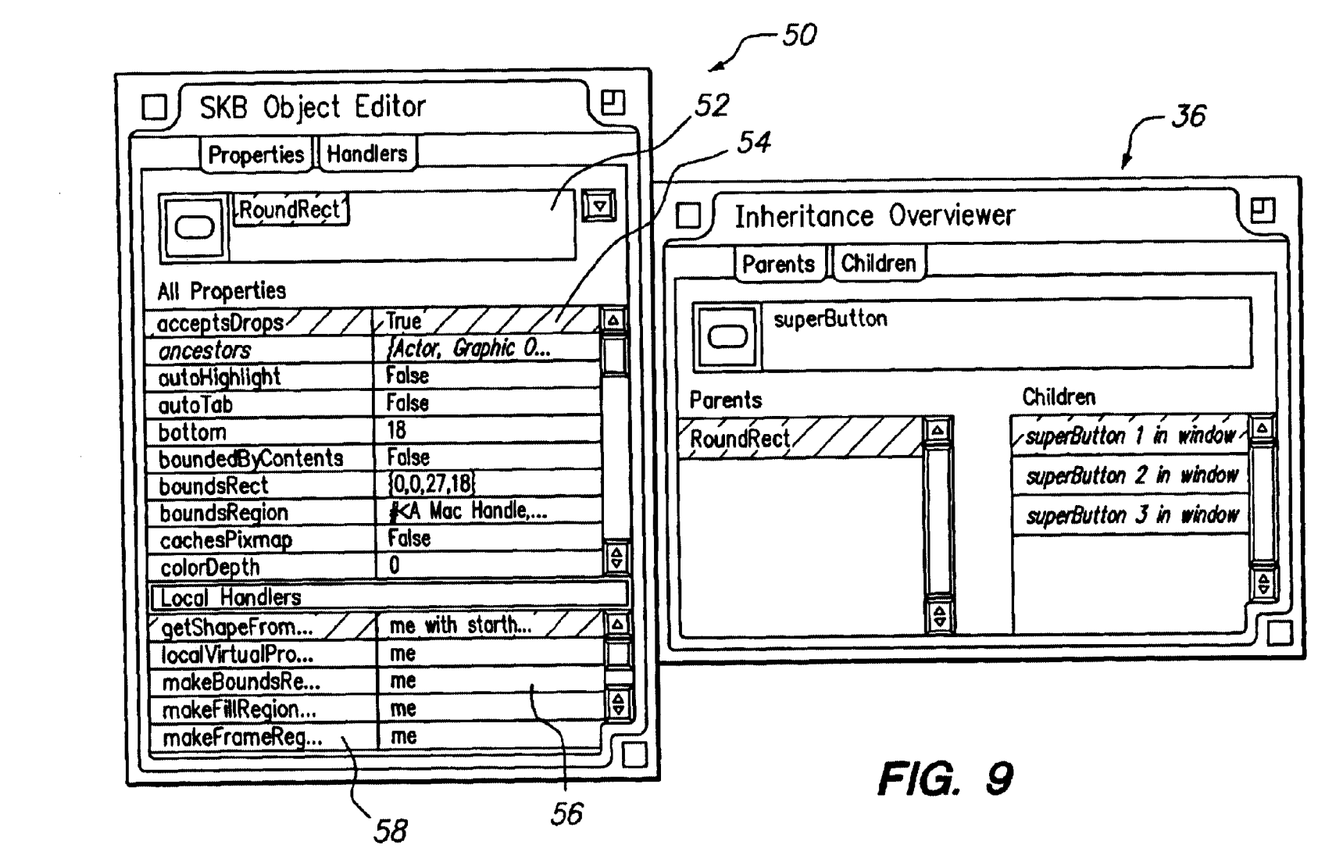
FIG. 9 is an illustration of an object editor interface together with the inheritance overviewer window.
Figure 10:
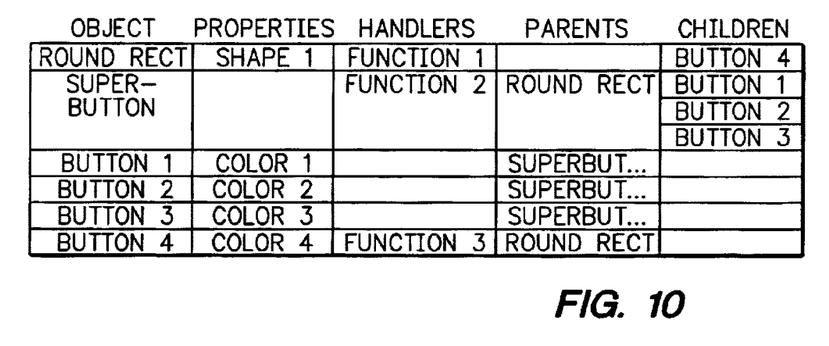
FIG. 10 is an illustration of the data file for the structure of FIG. 7.

Once the structure of objects has been established, the user can associate the desired properties and handlers with the new parent. In a preferred embodiment of the invention, this task is carried out by means of a drag and drop operation. To do so, the user can be provided with another form of interface that permits all of the properties and handlers for a given object to be viewed. An example of such an interface is shown in FIG. 9. An object editor window 50 is illustrated beside the inheritance overviewer window 36. This window also contains three panels. The top panel 52 is an input panel by which the user identifies an object of interest. The middle panel 54 lists all of the properties for that object, and the lower panel 56 sets forth the handlers for that object. In the specific example being described, the superbutton was spliced into the hierarchy to provide a single object which exhibited the functionality associated with buttons 1, 2 and 3. Therefore, it is desirable to transfer this functionality from one of these three buttons to the newly created superbutton. To do so, the user can select the handler 58 which performs that function and drag it from the object editor window 50 onto the name of the superbutton object in the inheritance overviewer window 36. By releasing the cursor control device when the handler is positioned over the name of the object, i.e., dragging and dropping the handler, it becomes associated with the newly created superbutton. When this action is performed, the database file in the memory 20 is modified to indicate the changed information. The modified database file is illustrated in FIG. 10. Referring thereto, it can be seen that a new object has been added to the file, namely the superbutton. Furthermore, the handler which was previously associated with buttons 1, 2 and 3 has been moved to the superbutton object.

A similar type of operation can be employed for properties. A user can select a property from the object editor window 50 and drag it onto the name of an object appearing in the inheritance overviewer window 36. If the selected property is local to the child and not previously defined for the parent, the property is moved to the parent. In this case, all of the children which descend from that parent, including the original, will inherit this property. The result of this action is to encapsulate and localize the property to the parent. If the property already existed in the parent, its value will be set to that of the child, thereby allowing the child to inherit the value from the parent. Subsequently, a dialog box can be presented, to permit the user to choose if all of the descendants should inherit this value, or it they should keep their current values. For example, it may be desirable to make gray as the default button color, but to leave the other existing buttons their current color. In this situation, the color property from the gray button can be dragged to the superbutton object, to establish its value as the default value. Via a dialog box, the user can choose whether or not to set that same value for each of the existing descendants.

This same drag and drop functionality can be employed to add parents and children in lieu of using the commands in the inheritance overviewer window. More particularly, whenever the name of a desired new parent or child appears in any interface element, such as a panel of the object editor window 50, the user can drag that name from its location and drag it into the appropriate panel 40 or 42 of the inheritance overviewer window 36. Through such an action, the dragged object is established as a new parent or child of the object whose name appears in the input panel 38, similar to carrying out the add command from the menu items 44 and 46.

Figure 11A:
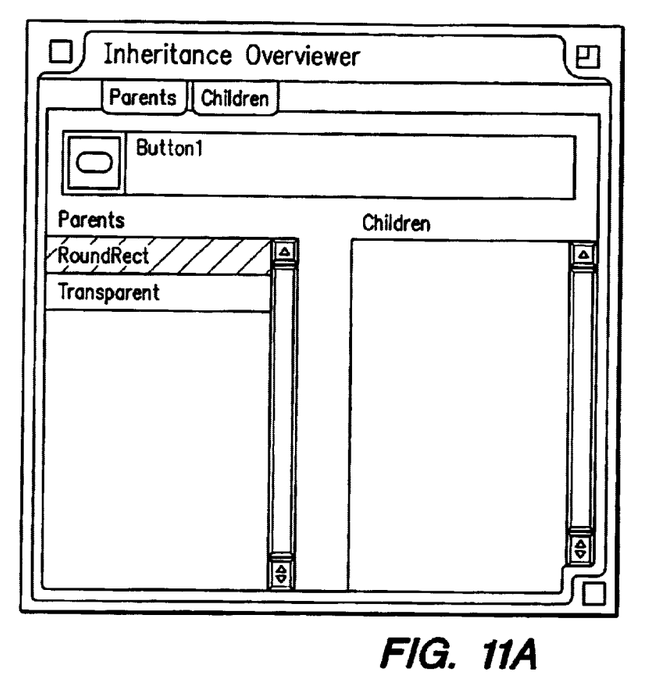
FIGS. 11A and 11B are illustrations of the inheritance overviewer window for an example in which an object has plural parent objects.
Figure 11B:
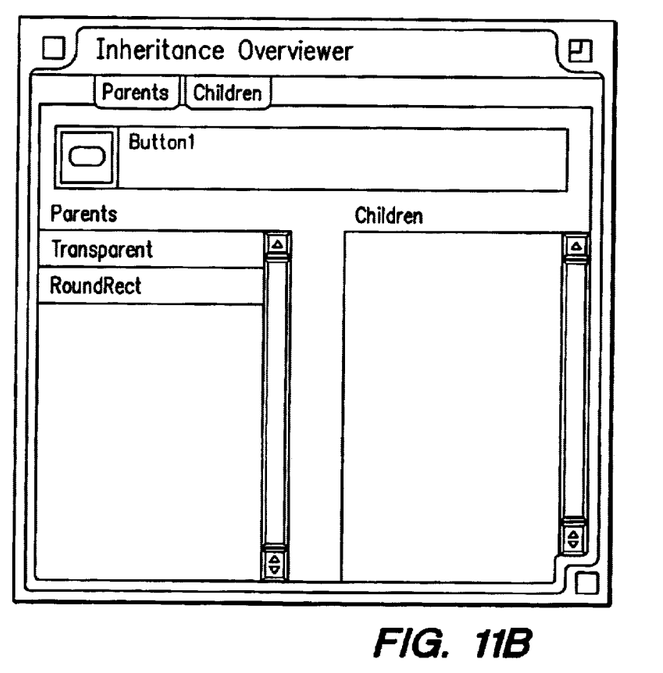

The dragging and dropping operation can also be employed within the inheritance overviewer window 36 to reorder the precedence of parents. In a heterarchical system, such as the one shown in FIG. 5A, when an object has two or more parent objects, those parents are given an order of precedence. If the parents have any conflicting properties, the precedence ordering determines which of the properties is controlling for the child object. For instance, in the example of FIG. 5A, if the object 35*a* has a shape property which specifies an oval shape, it conflicts with the round rectangle shape property of the object 34. Assuming that object 34 has precedence, as shown in FIG. 11A, the object "Button 1" would have a round rectangle shape. If the user prefers that the object have an oval shape, the name of the object 35*a* can be dragged on top of the object 34 within the panel 40 of the inheritance overviewer window 36. The result of this action is to give the object 35*a* precedence over the object 34, as depicted in FIG. 11B. Within the database file, the precedence order of parents might be indicated by another field for each record (not shown in FIG. 5B), which is modified accordingly in response to the drag and drop operation.

From the foregoing, it can be seen that the present invention provides a system which enables a programmer to easily generate design iterations in an object-oriented system, and thereby converge more quickly on an optimal solution. The flexibility of this system also permits the programmer to readily keep up with changes in product specifications and/or user needs. Furthermore, splicing objects into an existing hierarchy is readily facilitated, without the need to recompile code before the splice becomes effective.

It will be appreciated by those of ordinary skill in the art that the present invention can be embodied in other specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalents thereof are intended to be embraced therein.

What is claimed is:

1. An object-oriented computing system, comprising:
   a data file structure stored in a memory which contains an identification of objects in a software program, properties and handlers associated with respective objects, pointers to ancestor objects from which a given object inherits properties and handlers, and pointers to descendant objects which inherit properties and handlers from a given object;
   a user interface via which a user selects an object and which displays ancestor objects and descendant objects for the selected object;
   means associated with said interface for enabling a user to indicate a change in relationship between a selected object and at least two ancestor objects or at least one descendant object, wherein said change comprises a change in inherited attributes associated with said selected object; and
   means responsive to an indicated change for modifying one or more pointers associated with the selected object in said data file structure to correspond to said change.

2. The object-oriented system of claim 1 wherein said indicated change is the addition of a new object as an ancestor object, and wherein said modifying means is responsive to said indicated change to add a new object to said data file structure and to add a pointer to the selected object which points to said new object.

3. The object-oriented system of claim 1 wherein said indicated change is the splicing of an object between the selected object and an ancestor object, and wherein said modifying means is responsive to said indicated change to change a pointer associated with the selected object from one which points to the ancestor object to one which points to the spliced object.

4. The object-oriented system of claim 3 wherein said modifying means further changes a pointer associated with said ancestor object from one which points to the selected object to one which points to the spliced object.

5. The object-oriented system of claim 1 wherein said user interface further enables a user to move selected properties and handlers from one object to another, and said modifying means is responsive to such a move to change the association of properties and handlers in said data file structure from said one object to said other object in a corresponding manner.

6. The object-oriented system of claim 1 wherein said data file structure comprises a database in which each object forms the basis for a record in the database, and each record contains fields which respectively identify the pointers, handlers and direct ancestor objects of the object with which the record is associated.

7. The object-oriented system of claim 6 wherein each record also contains a field that identifies the direct descendant objects of the object with which the record is associated.

8. The object-oriented system of claim 1 wherein said user interface comprises:
a window that is displayed on a display device of the computer system, said window including:
a first panel which identifies an object of interest,
a second panel which identifies objects that are parent objects for the object of interest, and
a third panel which identifies objects that are children objects for the object of interest.

9. A user interface for designing the structure of objects in an object oriented computer system, comprising:
a window that is displayed on a display device of the computer system, said window including:
a first panel which identifies an object of interest;
a second panel which identifies at least two objects that are parent objects for the object of interest; and
a third panel which identifies objects that are children objects for the object of interest;
means for enabling a user to add or delete an object identified in one or more of said panels; and
means responsive to a user action indicating the addition or deletion of an object to one of said panels for modifying the structure of said object-oriented computer system in a corresponding manner by changing inherited attributes associated with said object of interest.

10. The user interface of claim 9 wherein said enabling means includes a cursor on said display device that is controlled by a user-activated input device.

11. The user interface of claim 9 wherein said enabling means further enables a user to splice an object between the object of interest and its identified parent objects, and said modifying means is responsive to a splicing command from a user to add a new level to the structure of the object-oriented system and insert an object at the new level.

12. The user interface of claim 9 wherein said enabling means includes a menu of commands in said window via which a user controls said enabling means to add or delete a parent or child object for an object of interest identified in said first panel.

13. The user interface of claim 9 wherein said enabling means and said modifying means includes a drag-and-drop function via which a user can move identification of objects into, within and between any of said panels to modify relationships between objects.

14. The user interface of claim 13 wherein said second panel identifies at least two objects that are parents of an object of interest, and wherein said drag-and-drop function enables a user to change a relative order of precedence among said parent objects.

15. A method for redesigning the structure of an object-oriented program in a computer, comprising the steps of:
storing in a memory a data file structure which identifies objects in said program, properties and handlers respectively associated with said objects, and parent objects from which a given object inherits properties and handlers;
displaying a user interface which identifies an object of interest, parent objects for said object of interest, and children objects which inherit properties and handlers from said object of interest;
indicating via said user interface a change in relationship between said object of interest and at least two parent objects or at least one child object for the object of interest, wherein said change in relationship comprises a change in inherited attributes associated with said object of interest; and
modifying said data file structure in response to said indication to identify said change in relationship.

16. The method of claim 15 wherein said change in relationship is the addition of a new level to said structure, and wherein said modifying step includes the steps of adding an object to said data file structure, identifying at least one parent of the object of interest as a parent of the added object, and identifying the object of interest as a child of the added object.

17. The method of claim 15 wherein said indicating step comprises the steps of dragging an indication of an object from one location on said user interface to a different location on said interface which is associated with a different relationship relative to the object of interest, and dropping the dragged indication at the different location to effect the change in relationship.

18. The method of claim 17 wherein said interface identifies at least two parent objects for the object of interest, and said dragging and dropping steps comprise changing a relative order of precedence for said parent objects.

19. An object-oriented computing system, comprising:
a data file structure stored in a memory which contains an identification of objects in a software program, properties and handlers associated with respective objects, pointers to ancestor objects from which a given object inherits properties and handlers, and pointers to descendant objects which inherit properties and handlers from a given object;
a graphical user interface via which a user selects an object and which displays ancestor objects and descendant objects for the selected object;
means associated with said graphical user interface for enabling a user to indicate a change in relationship between a selected object and at least two ancestor objects or at least one descendant object, wherein said change comprises a change in inherited attributes associated with said selected object; and
means responsive to an indicated change for modifying one or more pointers associated with the selected object in said data file structure to correspond to said change.

20. A method for redesigning the structure of an object-oriented program in a computer, comprising the steps of:
storing in a memory a data file structure which identifies objects in said program, properties and handlers respectively associated with said objects, and parent objects from which a given object inherits properties and handlers;
displaying a graphical user interface which identifies an object of interest, parent objects for said object of interest, and children objects which inherit properties and handlers from said object of interest;
indicating via said graphical user interface a change in relationship between said object of interest and at least two parent objects or at least one child object for the object of interest, wherein said change in relationship comprises a change in inherited attributes associated with said object of interest; and
modifying said data file structure in response to said indication to identify said change in relationship.

* * * * *